United States Patent
Be et al.

(10) Patent No.: US 10,305,527 B2
(45) Date of Patent: May 28, 2019

(54) COMMUNICATIVELY COUPLING MOBILE DEVICES TO WIRELESS LOCAL AREA NETWORKS OF VEHICLES

(71) Applicant: Ford Global Technologies, LLC, Dearborn, MI (US)

(72) Inventors: Tuan Anh Be, Livonia, MI (US); Allen R. Murray, Lake Orion, MI (US); David Joseph Orris, Allen Park, MI (US); Oliver Lei, Windsor (CA); Noorulla Mohammed, Farmington Hills, MI (US); Vladyslav Slyusar, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 59 days.

(21) Appl. No.: 15/416,774

(22) Filed: Jan. 26, 2017

(65) Prior Publication Data
US 2018/0213414 A1    Jul. 26, 2018

(51) Int. Cl.
| | | |
|---|---|---|
| *H04W 24/02* | (2009.01) | |
| *H04B 1/3822* | (2015.01) | |
| *H04W 4/04* | (2009.01) | |
| *H04W 4/02* | (2018.01) | |
| *H04W 4/40* | (2018.01) | |
| *H01Q 1/32* | (2006.01) | |
| *H04W 84/12* | (2009.01) | |

(Continued)

(52) U.S. Cl.
CPC ........... *H04B 1/3822* (2013.01); *H04W 4/02* (2013.01); *H04W 4/046* (2013.01); *H04W 4/40* (2018.02); *H01Q 1/3291* (2013.01); *H04B 7/04* (2013.01); *H04W 48/20* (2013.01); *H04W 84/12* (2013.01)

(58) Field of Classification Search
CPC . H04W 28/085; H04W 48/16; H04W 64/003; H04W 16/14; H04W 28/0268; H04W 88/08; H04W 84/12; H04W 24/02; H04W 4/04; H04B 7/06; H04B 1/3822; H01Q 1/32; H01Q 3/04
USPC ........................... 370/338–350; 455/456–502
See application file for complete search history.

(56) References Cited

U.S. PATENT DOCUMENTS

| | | |
|---|---|---|
| 7,672,686 B2 | 3/2010 | Simon et al. |
| 8,554,264 B1 | 10/2013 | Gibbons et al. |
| 9,526,076 B1 | 12/2016 | Park |

(Continued)

FOREIGN PATENT DOCUMENTS

| | | |
|---|---|---|
| CN | 105430732 A | 3/2016 |
| JP | 2006109131 A | 4/2006 |
| WO | WO 2016142081 A1 | 9/2016 |

OTHER PUBLICATIONS

Search Report dated Jun. 1, 2018 for Great Britain Patent Application No. GB 1801118.9 (3 Pages).

*Primary Examiner* — Man U Phan
(74) *Attorney, Agent, or Firm* — Frank Lollo; James P. Muraff; Neal, Gerber & Eisenberg LLP

(57) ABSTRACT

Method and apparatus are disclosed for communicatively coupling mobile devices to wireless local area networks of vehicles. An example vehicle includes a communication module for a wireless local area network including an internal antenna and an external antenna. The example vehicle also includes an antenna adjuster to communicatively couple, in response to determining a mobile device is inside a vehicle cabin, the internal antenna to the mobile device and to communicatively couple, in response to determining the mobile device is outside of the vehicle cabin, the external antenna to the mobile device.

19 Claims, 4 Drawing Sheets

(51) Int. Cl.
*H04W 48/20* (2009.01)
*H04B 7/04* (2017.01)

(56) References Cited

U.S. PATENT DOCUMENTS

2005/0101340 A1  5/2005  Archiable
2016/0165548 A1  6/2016  Mohlmann et al.

COMMUNICATIVELY COUPLING MOBILE DEVICES TO WIRELESS LOCAL AREA NETWORKS OF VEHICLES

TECHNICAL FIELD

The present disclosure generally relates to vehicles and, more specifically, communicatively coupling mobile devices to wireless local area networks of vehicles.

BACKGROUND

Oftentimes, an occupant (e.g., drivers, passengers) of a vehicle wirelessly accesses a network (e.g., the Internet) via a mobile device while travelling in the vehicle. For example, a driver and/or a passenger may access directions to a destination point while driving the vehicle. In some instances, the mobile device wirelessly connects to the Internet via a cellular data network. In other instances, the mobile device wirelessly connects to the Internet via a node of a wireless local area network. Some vehicles include the wireless local area network node (e.g., a Wi-Fi® hotspot) that enables the mobile device to connect to the Internet.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for communicatively coupling mobile devices to wireless local area networks of vehicles. An example disclosed vehicle includes a communication module for a wireless local area network including an internal antenna and an external antenna. The example disclosed vehicle also includes an antenna adjuster to communicatively couple, in response to determining a mobile device is inside a vehicle cabin, the internal antenna to the mobile device and to communicatively couple, in response to determining the mobile device is outside of the vehicle cabin, the external antenna to the mobile device.

An example disclosed method for communicatively coupling mobile devices to wireless local area networks of vehicles includes communicatively coupling, via a processor, an internal antenna of a communication module of a vehicle to a mobile device in response to determining the mobile device is inside a vehicle cabin. The example disclosed method also includes communicatively coupling an external antenna of the communication module to the mobile device in response to determining the mobile device is outside the vehicle cabin.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1A:
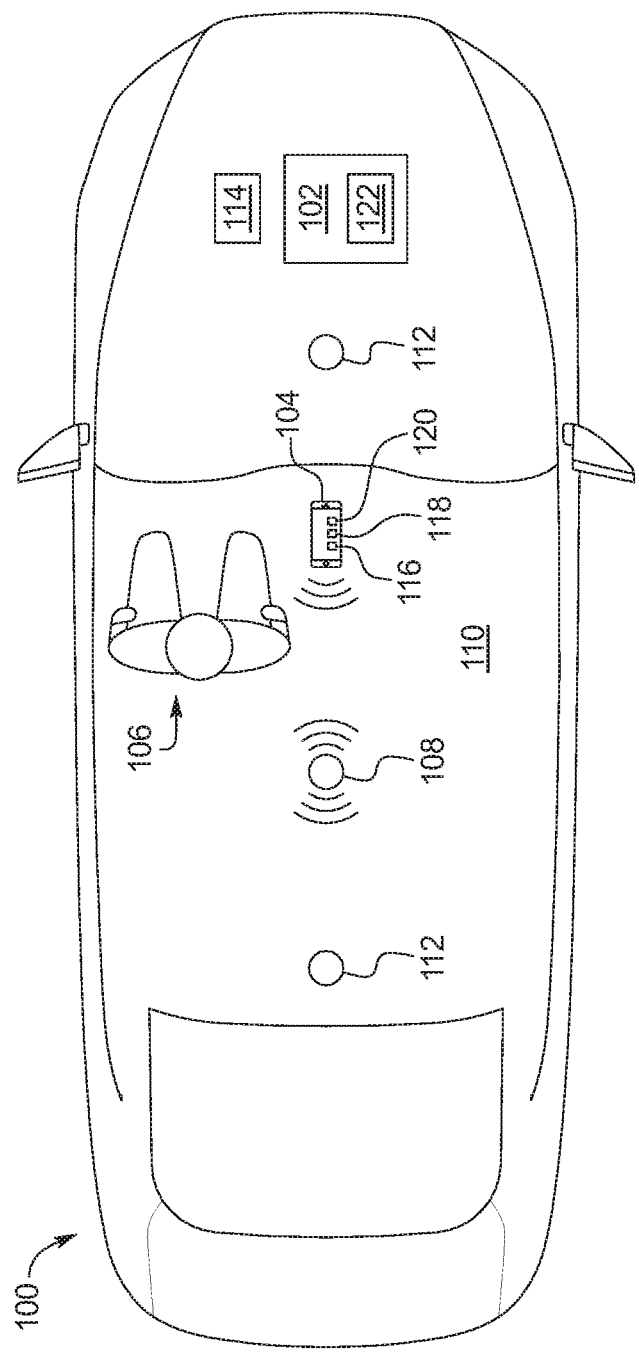
FIG. 1A illustrates a mobile device communicatively coupled to an internal antenna for a wireless local area network of an example vehicle in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Oftentimes, occupants (e.g., drivers, passengers) of a vehicle wirelessly access a network (e.g., the Internet) via mobile devices while travelling in the vehicle. For example, a driver and/or a passenger may access directions to a destination point. In some instances, the mobile devices wirelessly connect to the Internet via a cellular data network. In other instances, the mobile devices wirelessly connect to the Internet via a node of a wireless local area network to avoid connecting to the network via the cellular data network. For example, the occupant may utilize the wireless local area network to reduce an amount of battery and/or data consumption while accessing the Internet via the mobile device. Some vehicles include the wireless local area network node (e.g., a Wi-Fi® hotspot) for vehicle-to-infrastructure communication that enables the mobile device to connect to the Internet.

Some communication modules of vehicles for vehicle-to-infrastructure communication are configured (e.g., positioned, oriented, set to transmit at a signal strength, etc.) such that mobile devices within the vehicle are able to communicatively connect to the communication module and mobile devices outside the vehicle are unable to communicatively connect to the communication module. While such a configuration may deter interference with other nearby communication modules and/or communication with mobile devices of other nearby vehicles, such a configuration also potentially prevents the communication module from maintaining a communicative coupling with a mobile device of an occupant of the vehicle once the occupant leaves the vehicle with the mobile device.

Examples methods, apparatus, and computer readable media disclosed herein include a communication module for a wireless local area network of a vehicle (e.g., for vehicle-to-infrastructure communication) that transitions between communicatively coupling to a mobile device via an internal antenna that communicatively couples to the mobile device when the mobile device is inside the vehicle and external antennas that communicatively couples to the mobile device when the mobile device is outside the vehicle. When the internal antenna is communicatively coupled to the mobile device, the communication module communicatively couples to the mobile device in an energy-efficient manner while deterring interference with other nearby communication modules and/or other mobile devices outside of the vehicle from communicatively coupling with the communication module. When the external antennas are communicatively coupled to the mobile device, a range of communicative coupling with the mobile device is increased by enabling the mobile device to communicatively couple to the communication module when the mobile device is outside of the vehicle.

Example vehicles disclosed herein includes a communication module for a wireless local area network (e.g., a Wi-Fi® hotspot) that includes an internal antenna and an external antenna. For example, the communication module detects a mobile device (e.g., a smart phone, a tablet, a wearable, a smart watch, etc.) by broadcasting a beacon to prompt the mobile device to send a return signal and subsequently receiving the return signal from the mobile device. The example vehicles also include an antenna adjuster that determines whether the detected mobile device is located within a vehicle cabin. As used herein, a "cabin" and a "vehicle cabin" refer to a portion of an interior of a vehicle in which an occupant (e.g., a driver, a passenger) sits. In some examples, the communication module includes the antenna adjuster. In some examples, the antenna adjuster compares a vehicle location to a location of the mobile device to determine whether the mobile device is located inside the vehicle cabin. In such examples, the antenna adjuster collects the vehicle location via a global positioning system (GPS) receiver of the vehicle and collects the location of the mobile device from the mobile device via the communication module.

Further, the antenna adjuster communicatively couples the internal antenna of the communication module to the mobile device in response to determining that the mobile device is within the vehicle cabin. Alternatively, in response to determining that the mobile device is outside of the vehicle cabin, the antenna adjuster communicatively couples the external antenna of the communication module to the mobile device. As used herein, an "internal antenna" refers to an antenna of a communication module for a wireless local area network of a vehicle that is configured (e.g., positioned, oriented, set to transmit at a signal strength, etc.) to communicatively couple to mobile devices located within a cabin of the vehicle. As used herein, "external antenna" refers to an antenna of a communication module for a wireless local area network of a vehicle that is configured (e.g., positioned, signal strength selected, etc.) to communicatively couple to mobile devices located outside of and adjacent to a cabin of the vehicle.

In some examples, the communication module collects connection strength data from the mobile device when the external antenna of the communication module is communicatively coupled to the mobile device. In such examples, the antenna adjuster determines a connection strength based on the connection strength data collected from the mobile device. As used herein, a "connection strength" and "signal strength" refer to a strength of a signal sent from a transmitter (e.g., a communication module) to a recipient (e.g., a mobile device) as perceived and/or measured by the recipient. As used herein, "connection strength data" refers to data that is collected and utilized to determine a connection strength. For example, connection strength data includes a received signal power, a packet error rate (PER), and/or a received signal strength indicator (RSSI) of a mobile device.

As used herein, a "packet error rate" refers to a number of error packets divided by a total number of received packets of information. As used herein, a "packet" refers to unit of data for radio transmission.

In some examples in which a connection strength is determined, the antenna adjuster compares the connection strength to a first threshold. Further, in response to determining that the connection strength is less than the first threshold, the antenna adjuster adjusts the external antenna of the communication module to increase the connection strength between the external antenna and the mobile device. For example, the antenna adjuster increases the connection strength by increasing a power of a signal transmitted by the external antenna and/or by adjusting a direction of the external antenna. Additionally or alternatively, the antenna adjuster compares the connection strength to a second threshold that is greater than the first threshold. In response to determining that the connection strength is greater than the second threshold, the antenna adjuster adjusts the external antenna of the communication module to reduce the connection strength between the external antenna and the mobile device.

In some examples, the communication module includes a plurality of external antennas that communicatively couple to the mobile device when the mobile device is outside of and adjacent to the vehicle cabin. The antenna adjuster may utilize multiple-input and multiple-output (MIMO) processing to increase the connection strength produced by the plurality of external antennas. For example, each of the plurality of external antennas may be omnidirectional antennas. In such examples, the antenna adjuster utilizes antenna beamforming to form a directional signal from the plurality of omnidirectional, external antennas that is directed toward the mobile device to increase the connection strength between the communication module and the mobile device. As used herein, "multiple-input and multiple-output processing" refers to a process for increasing a connection strength with a communication device (e.g., a mobile device) via multipath propagation by simultaneously sending a plurality of data signals over one radio channel via a plurality of respective antennas. As used herein, an "omnidirectional antenna" refers to an antenna that transmits (e.g., uniformly) a signal and/or power in all directions along a plane relative to the antenna (e.g., perpendicular to a longitudinal axis of the antenna). As used herein, a "directional antenna" refers to an antenna that transmits and/or receives a stronger signal and/or greater power in one direction relative to other directions. As used herein, "beamforming" and "antenna beamforming" refer to a signal processing technique in which an array of antennas (i.e., two or more omnidirectional antennas) form a directional signal by combining elements of signals of each of the respective antennas such that constructive interference occurs at some angles and destructive interference occurs at other angles.

Figure 1B:
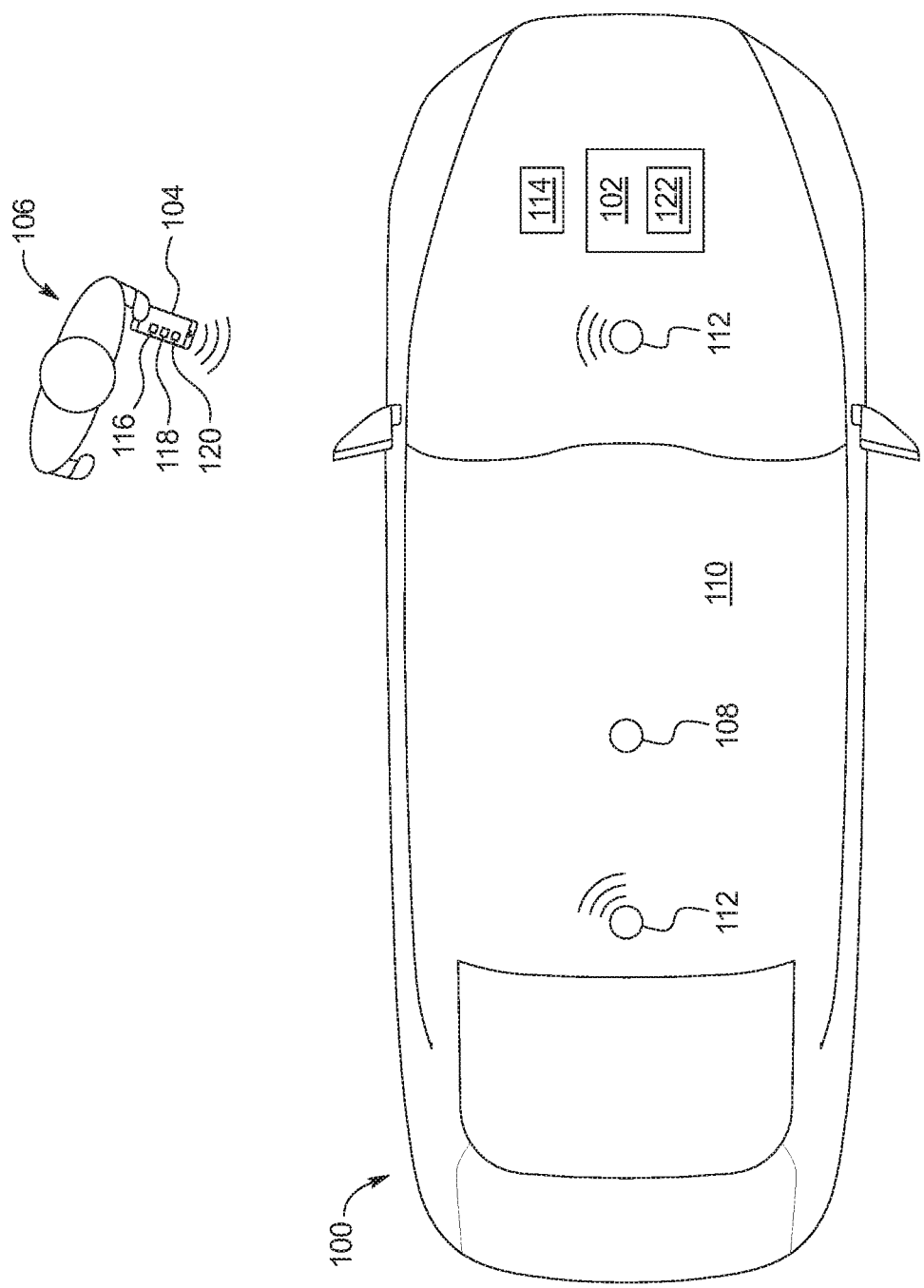
FIG. 1B illustrates the mobile device of FIG. 1A communicatively coupled to an external antenna for the wireless local area network of the vehicle of FIG. 1A in accordance with the teachings herein.

Turning to the figures, FIGS. 1A-1B illustrate an example vehicle 100 in accordance with the teachings herein that includes a communication module 102 for a wireless local area network (e.g., a Wi-Fi® hotspot) to communicatively couple to a mobile device 104 (e.g., a smart phone, a tablet, a wearable, a smart watch, etc.) of a user 106. More specifically, FIG. 1A illustrates the communication module 102 communicatively coupled to the mobile device 104 via an internal antenna 108 when the mobile device 104 is inside a cabin 110 of the vehicle 100, and the FIG. 1B illustrates the communication module 102 communicatively coupled to the mobile device 104 via a plurality of external antennas 112 when the mobile device 104 is outside the cabin 110 and adjacent to the vehicle 100.

The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). In the illustrated example, the vehicle 100 includes the communication module 102 and a GPS receiver 114. The GPS receiver 114 receives a signal from a global positioning system to monitor and/or identify a location of the vehicle 100, and the communication module 102 communicatively couples to the mobile device 104 of the user 106.

The communication module 102 for the wireless local area network of the vehicle 100 includes hardware (e.g., processors, memory, storage, antenna, etc.) and software to control the wireless local area network. As illustrated in FIG. 1A, the communication module 102 includes the internal antenna 108 that communicatively couples to the mobile device 104 when the mobile device 104 is located inside the cabin 110 of the vehicle 100. For example, the internal antenna 108 is an omnidirectional antenna located within a liner positioned along an upper wall of the cabin 110 of the vehicle 100. The internal antenna 108 is configured (e.g., positioned, set to transmit at a signal strength, etc.) so that mobile devices inside the cabin (e.g., the mobile device 104 in FIG. 1A) are able to establish a communicative connection with the communication module 102 and mobile devices outside the cabin (e.g., the mobile device 104 in FIG. 1B) are unable to establish a communicative connection with the communication module 102. By utilizing the internal antenna 108, the communication module 102 is able to communicate with the mobile device 104 located inside of the cabin 110 in an energy-efficient manner while deterring other mobile devices outside of the cabin 110 to communicatively couple with the communication module 102.

As illustrated in FIG. 1B, the communication module 102 for the wireless local area network of the vehicle 100 includes the external antennas 112 that communicatively couple to the mobile device 104 when the mobile device 104 is located outside of and adjacent to the cabin 110 of the vehicle 100. For example, the external antennas 112 communicatively couple to the mobile device 104 when the mobile device 104 is outside of the cabin 110 of the vehicle 100 and inside a communication range of the communication module 102. The external antennas 112 are located on a roof of the vehicle 100. In the illustrated example, the vehicle 100 includes an array of the external antennas 112 that are spaced apart from each other. One of the external antennas 112 is located toward a front of the vehicle 100, and the other of the external antennas 112 is located toward a rear of the vehicle 100. In some examples, the communication module 102 utilizes multiple-input and multiple-output (MIMO) processing to increase the connection strength between external antennas 112 and the mobile device 104. Further, in some examples, the external antennas 112 are omnidirectional antennas. In some such examples, the communication module 102 utilizes beamforming to produce a directional signal toward the mobile device 104 that increase the connection strength between external antennas 112 and the mobile device 104. In other examples, the vehicle 100 may include more or less of the external antennas 112. For example, the vehicle 100 may include one external antenna that is a directional antenna to send a directional signal toward the mobile device 104.

In the illustrated example, the mobile device 104 includes a processor 116, a GPS receiver 118, and a communication module 120. The processor 116 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). Instructions, which may embody one or more of methods or logic of the mobile device 104, reside completely, or at least partially, within any one or more of memory, computer readable medium, and/or the processor 116 during execution of the instructions. Further, the GPS receiver 118 receives a signal from a global positioning system to monitor and/or identify a location of the mobile device 104. The communication module 120 includes wired or wireless network interfaces to enable communication with external networks (e.g., the wireless local area network of the vehicle 100). The communication module 120 also includes hardware (e.g., processors, memory, storage, antenna, etc.) and software to control the wired or wireless network interfaces. In the illustrated example, the communication module 120 includes one or more communication controllers and a wireless interface to communicatively couple with the communication module 102 of the vehicle 100. For example, the communication module 120 of the mobile device 104 sends connection strength data (e.g., a received signal power, a packet error rate, a received signal strength indicator (RSSI), etc.) and/or location data (e.g., determined via the GPS receiver 116) of the mobile device 104 to the communication module 102 of the vehicle 100.

Further, as illustrated in FIGS. 1A-1B, the vehicle 100 the communication module 102 of the vehicle 100 includes an antenna adjuster 122 that determines whether to communicatively couple the mobile device 104 to the communication module 102 via the internal antenna 108 or the external antennas 112. In operation, the antenna adjuster 122 establishes communication with the mobile device 104 when the mobile device 104 is near the vehicle 100 by instructing the communication module 102 to broadcast a beacon to prompt the mobile device 104 to send a return signal and subsequently receive the return signal from the mobile device 104. Upon the communication module 102 receiving the return signal, the antenna adjuster 122 authenticates or authorizes the mobile device 104 for communication with the communication module 102.

When the communication module 102 is communicatively coupled to the mobile device 104, the antenna adjuster 122 determines whether the mobile device 104 is located within the cabin 110 of the vehicle 100. In some examples, the antenna adjuster 122 compares the location of the vehicle 100 of the vehicle 100 and the location of the mobile device 104 to determine whether the mobile device 104 is inside the cabin 110 of the vehicle 100. In such examples, the location of the vehicle 100 is identified via the GPS receiver 114, and the location of the mobile device 104 is identified via the GPS receiver 118 of the mobile device 104 and transmitted to the communication module 102 of the vehicle 100 via the communication module 120 of the mobile device 104. In some examples, the antenna adjuster 122 determines whether the mobile device 104 is located within the cabin 110 of the vehicle 100 by determining the distance between the mobile device 104 and the vehicle 100.

In such examples, the antenna adjuster 122 determines the distance based on the RSSI that the communication module 120 of the mobile device 104 sends to the communication module 102 of the vehicle 100 (e.g., in the response signal upon receiving the beacon).

In response to determining that the mobile device 104 is inside the cabin 110, the antenna adjuster 122 communicatively couples the internal antenna 108 to the mobile device 104. Otherwise, in response to determining that the mobile device 104 is outside of the cabin 110, the antenna adjuster 122 communicatively couples the external antennas 112 to the mobile device 104. In some examples, the antenna adjuster 122 causes the communication module 102 to transition between being communicatively coupled to the mobile device 104 via the internal antenna 108 and being communicatively coupled to the mobile device 104 via the external antenna 112. For example, if the user 106 enters the cabin 110 of the vehicle 100 with the mobile device 104, the antenna adjuster 122 causes the mobile device 104 to transition from being communicatively coupled via the external antennas 112 to being communicatively coupled via the internal antenna 108. If the user 106 leaves the cabin 110 with the mobile device 104, the antenna adjuster 122 causes the mobile device 104 to transition from being communicatively coupled via the internal antenna 108 to being communicatively coupled via the external antenna 112.

When the mobile device 104 is connected to the communication module 102 of the vehicle 100 via the external antennas 112, the communication module 102 collects connection strength data from the mobile device 104. The antenna adjuster 122 determines a connection strength between the mobile device 104 and the communication module 102 based on the connection strength data (a received signal power, a packet error rate (PER), the RSSI, etc). For example, the antenna adjuster 122 determines the connection strength by, at least in part, comparing the received signal power received of the communication module 120 of the mobile device 104 to a transmitted signal power of the communication module 102 of the vehicle 100. In some examples, the connection strength between the mobile device 104 and the external antennas 112 may change over time. For example, the connection strength may increase as the user 106 approaches the vehicle 100 with the mobile device 104. The connection strength may decrease as a result of inclement weather (e.g., rain, snow, etc.), interference from nearby objects (e.g., a grouping of trees, other nearby wireless local area network hotspots, etc.), and/or the user 106 moving farther away from the vehicle 100 with the mobile device 104.

In some examples, when the connection strength becomes less than a first connection strength threshold, the antenna adjuster 122 adjusts the external antennas 112 to increase the connection strength. For example, the antenna adjuster 122 increases the connection strength as the user 106 moves farther away from the vehicle 100 with the mobile device 104. The antenna adjuster 122 increases a power of a signal transmitted by the external antennas 112 and/or adjusts a direction of the external antennas 112 to direct the transmitted signal toward the location of the mobile device 104. In some examples, the antenna adjuster 122 utilizes multiple-input and multiple-output (MIMO) processing, beamforming, and/or any other technique that enables the external antennas 112 to increase the connection strength with the mobile device 104. Further, the mobile device 104 may present am "out of range" warning to the user 106 when the user 106 approaches an outer boundary of a communication range of the external antennas 112 (e.g., to assist the user 106 in staying within the communication range of the external antennas 112, to inform the user 106 that the user 106 will lose connection with the external antennas 112, etc.). Additionally or alternatively, when the connection strength is greater than a second connection strength threshold that is greater than the first connection strength threshold, the antenna adjuster 122 adjusts the external antennas 112 to reduce the connection strength. For example, the antenna adjuster 122 reduces the connection strength when the user 106 is approaching the vehicle 100 with the mobile device 104.

While FIGS. 1A-1B depict the communication module communicatively coupled to one mobile device (e.g., the mobile device 104), the communication module 102 may be communicatively coupled simultaneously to a plurality of mobile devices. For example, two or more mobile devices may be communicatively coupled to the communication module via the internal antenna 108 and/or two or more mobile devices may be communicatively coupled to the communication module via the external antennas 112. In some examples, the connection strength is affected by a number of mobile devices communicatively coupled to the communication module 102. For example, the antenna adjuster 122 increases the power of the signal transmitted by the communication module 102 when additional mobile devices become communicatively coupled to the communication module 102.

Figure 2:
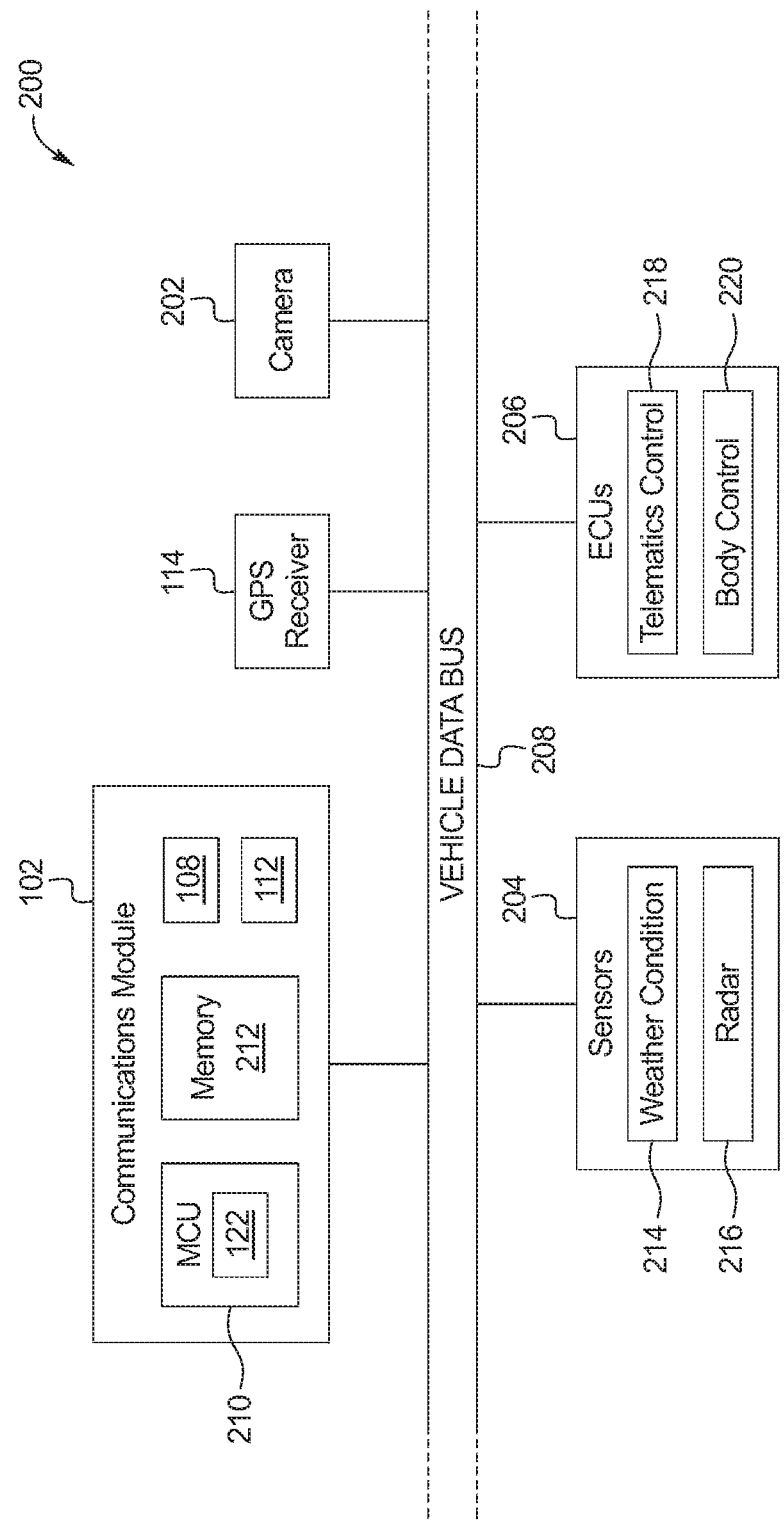
FIG. 2 is a block diagram of electronic components of the vehicle of FIGS. 1A-1B.

FIG. 2 is a block diagram of electronic components 200 of the vehicle of FIGS. 1A-1B. In the illustrated example, the electronic components 200 include the communication module 102, the GPS receiver 114, a camera 202, sensors 204, electronic control units (ECUs) 206, and a vehicle data bus 208.

As illustrated in FIG. 2, the communication module 102 includes a microcontroller unit, controller or processor 210; memory 212; the internal antenna 108; and the external antennas 112. In some examples, the processor 210 of the communication module 102 is structured to include the antenna adjuster 122. Alternatively, in some examples, the antenna adjuster 122 is incorporated into an electronic control unit (ECU) with its own processor 210 and memory 212. The processor 210 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 212 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 212 includes multiple kinds of memory, particularly volatile memory and non-volatile memory.

The memory 212 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 212, the computer readable medium, and/or within the processor 210 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The camera 202 is positioned within the vehicle 100 to monitor an area exterior to and surrounding the vehicle 100. For example, the camera 202 collects, obtains, and/or retrieves images of the area exterior to and surrounding the vehicle 100. The antenna adjuster 122 and/or the processor 210 may analyze the images obtained via the camera 202 to identify objects (e.g., a grouping of trees) near the vehicle 100 that may affect the connection strength between the communication module 102 and the mobile device 104. For example, the communication module 102 may increase the signal power transmitted by the external antennas 112 and/or adjust the direction of the external antennas 112 to deter nearby objects identified via the camera 202 from decreasing the connection strength between the communication module 102 and the mobile device 104.

The sensors 204 are arranged in and around the vehicle 100 to monitor properties of the vehicle 100 and/or an environment in which the vehicle 100 is located. One or more of the sensors 204 may be mounted to measure properties around an exterior of the vehicle 100. Additionally or alternatively, one or more of the sensors 204 may be mounted inside a cabin of the vehicle 100 or in a body of the vehicle 100 (e.g., an engine compartment, wheel wells, etc.) to measure properties in an interior of the vehicle 100. For example, the sensors 204 include accelerometers, odometers, tachometers, pitch and yaw sensors, wheel speed sensors, microphones, tire pressure sensors, biometric sensors and/or sensors of any other suitable type. In the illustrated example, the sensors 204 include a weather condition sensor 214 and a radar sensor 216. For example, the weather condition sensor 214 detects a weather condition of the environment in which the vehicle 100 is located. In some examples, the antenna adjuster 122 increases the signal power transmitted by the external antennas 112 and/or adjusts the direction of the external antennas 112 in response to the weather condition sensor 214 detecting a weather condition (e.g., rain, snow, etc.) that may decrease the connection strength between the communication module 102 and the mobile device 104. The radar sensor 216 detects whether objects (e.g., a grouping of trees) are near the vehicle 100 that may affect the connection strength between the communication module 102 and the mobile device 104. For example, the communication module 102 may increase the signal power transmitted by the external antennas 112 and/or adjust the direction of the external antennas 112 to deter the nearby objects from decreasing the connection strength. In other examples, the vehicle 100 includes a lidar sensor, an ultrasonic sensor, and/or any other sensor that is able to detect the presence and location of objects near the vehicle 100.

The ECUs 206 monitor and control the subsystems of the vehicle 100. For example, the ECUs 206 are discrete sets of electronics that include their own circuit(s) (e.g., integrated circuits, microprocessors, memory, storage, etc.) and firmware, sensors, actuators, and/or mounting hardware. The ECUs 206 communicate and exchange information via a vehicle data bus (e.g., the vehicle data bus 208). Additionally, the ECUs 206 may communicate properties (e.g., status of the ECUs 206, sensor readings, control state, error and diagnostic codes, etc.) to and/or receive requests from each other. For example, the vehicle 100 may have seventy or more of the ECUs 206 that are positioned in various locations around the vehicle 100 and are communicatively coupled by the vehicle data bus 208. In the illustrated example, the ECUs 206 include a telematics control unit 218 and a body control module 220. For example, the telematics control unit 218 controls tracking of the vehicle 100, for example, utilizing data received by the GPS receiver 114 of the vehicle 100. The body control module 220 controls one or more subsystems throughout the vehicle 100, such as power windows, power locks, an immobilizer system, power mirrors, etc. For example, the body control module 220 includes circuits that drive one or more of relays (e.g., to control wiper fluid, etc.), brushed direct current (DC) motors (e.g., to control power seats, power locks, power windows, wipers, etc.), stepper motors, LEDs, etc.

The vehicle data bus 208 communicatively couples the communication module 102, the GPS receiver 114, the camera 202, the sensors 204, and the ECUs 206. In some examples, the vehicle data bus 208 includes one or more data buses. The vehicle data bus 208 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 3:
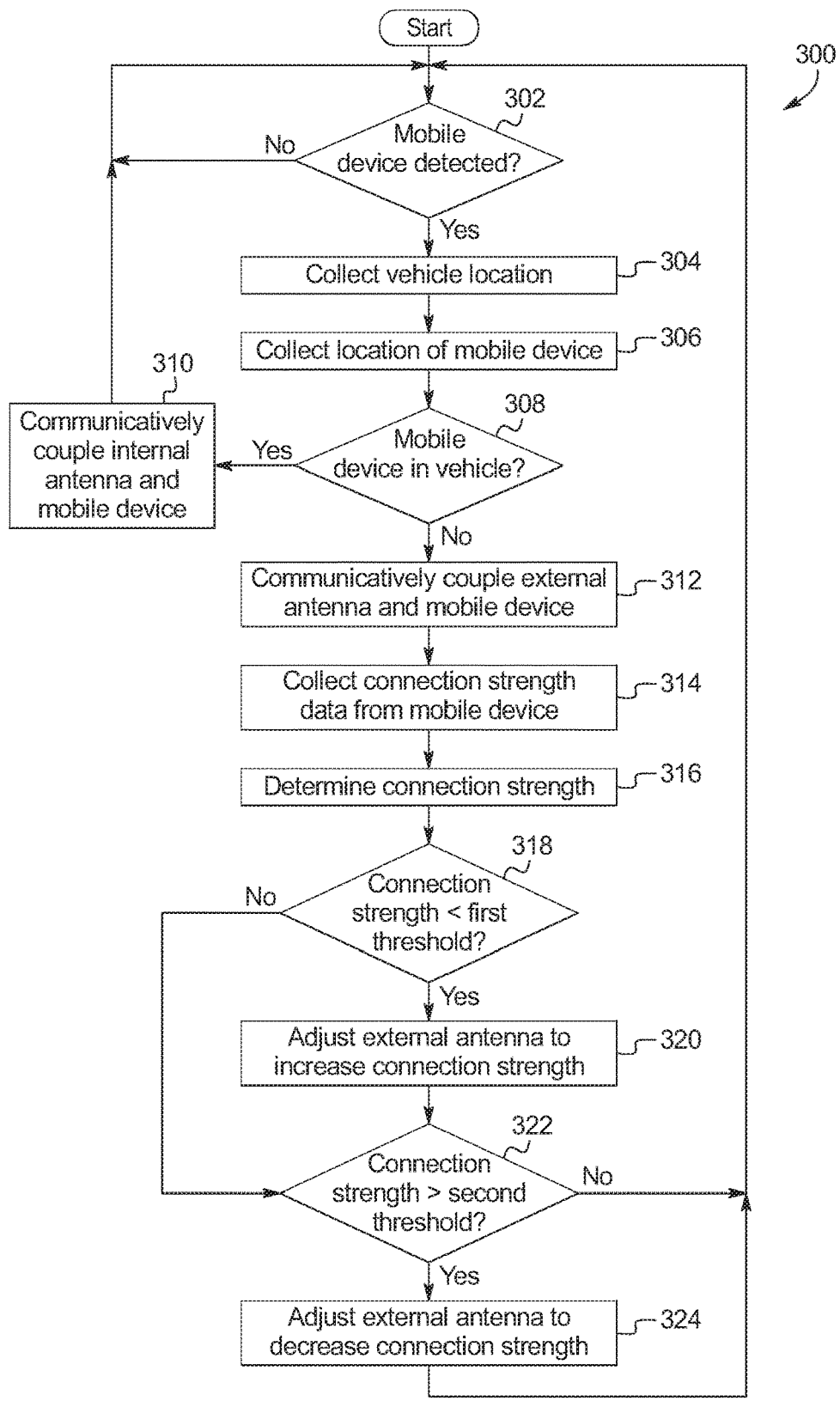
FIG. 3 is a flowchart of an example method to communicatively couple the mobile device to the wireless local area network of the vehicle of FIGS. 1A-1B in accordance with the teachings herein.

FIG. 3 is a flowchart of an example method 300 for a communication module of a wireless local area network of a vehicle to communicatively couple to a mobile device. The flowchart of FIG. 3 is representative of machine readable instructions that are stored in memory (such as the memory 312 of FIG. 3) and include one or more programs which, when executed by a processor (such as the processor 310 of FIG. 3), cause the vehicle 100 to implement the example antenna adjuster 122 of FIGS. 1A-2. While the example program is described with reference to the flowchart illustrated in FIG. 3, many other methods of implementing the example antenna adjuster 122 may alternatively be used. For example, the order of execution of the blocks may be rearranged, changed, eliminated, and/or combined to perform the method 300. Further, because the method 300 is disclosed in connection with the components of FIGS. 1A-2, some functions of those components will not be described in detail below.

Initially, at block 302, the antenna adjuster 122 determines whether a mobile device (e.g., the mobile device 104) is detected by the communication module 102 of the vehicle 100. For example, the communication module 102 detects the mobile device 104 broadcasting a beacon that prompts the mobile device 104 to send a return signal and subsequently receiving the return signal from the mobile device 104. In response to determining that no mobile device is detected, the method 300 returns to block 302 until a mobile device is detected.

In response to determining that the communication module 102 has detected the mobile device 104, the antenna adjuster 122 collects a location of the vehicle 100 via the GPS receiver 114 of the vehicle 100 (block 304). At block 306, the antenna adjuster 122 collects a location of the mobile device 104. For example, GPS receiver 118 of the mobile device 104 receives the location of mobile device 104, the communication module 120 of the mobile device 104 sends the communication module 102 of the vehicle 100, and the antenna adjuster 122 receives the location of the mobile device 104 via the communication module 102. Additionally or alternatively, the antenna adjuster 122 determines a distance between the vehicle 100 and the mobile device 104 based on a received signal strength indicator (RSSI) that is sent from the communication module 120 of the mobile device 104 to the communication module 102 of the vehicle.

At block 308, the antenna adjuster 122 determines whether the mobile device 104 is located inside the cabin 110 of the vehicle 100. For example, the antenna adjuster 122 compares the location of the vehicle 100 to the location of the mobile device 104 to determine whether the mobile device 104 is inside the vehicle 100. In response to determining that the mobile device 104 is inside the vehicle 100, the antenna adjuster 122 communicatively couples to the mobile device 104 via the internal antenna 108 of the communication module 102 (block 310). Upon communicatively coupling the internal antenna 108 and the mobile device 104, the method 300 returns to block 302. In response to determining that the mobile device 104 is outside the vehicle 100, the antenna adjuster 122 communicatively couples to the mobile device 104 via the external antennas 112 of the communication module 102 (block 312).

At block 314, the antenna adjuster 122 collects connection strength data from the mobile device 104. For example, the mobile device 104 determines the connection strength data (e.g., packet error rate, received signal strength, etc.), and the communication module 102 of the vehicle 100 receives the connection strength data from the communication module 120 of mobile device 104. Further, in some examples, the antenna adjuster collects a signal strength transmitted by the communication module 102 of the vehicle 100 and/or a distance between mobile device 104 and the vehicle 100. The antenna adjuster 122 may determine the distance between the mobile device 104 and the vehicle 100 via the RSSI sent to the communication module 102 by the mobile device 104 and/or by comparing the respective locations of the mobile device 104 and the vehicle 100.

At block 316, the antenna adjuster 122 determines the connection strength based on the collected connection strength data. For example, the antenna adjuster 122 determines the connection strength based on the packet error rate, the difference between the transmitted signal strength and the received signal strength, and/or the distance between the mobile device 104 and the vehicle 100.

At block 318, the antenna adjuster 122 determines whether the connection strength is less than a predetermined first threshold. For example, the connection strength may be less than the first threshold if there is inclement weather, there is another wireless local area network hotspot nearby, and/or the user 106 has moved away from the vehicle 100 with the mobile device. In response to determining that the connection strength is less than the predetermined threshold, the antenna adjuster 122 adjusts the external antennas 112 to increase the connection strength between the mobile device 104 and the communication module 102 (block 320). For example, the antenna adjuster 122 increases the connection strength by increasing the signal power transmitted by the external antennas 112 and/or adjusting a direction of the signals transmitted by the external antennas 112. In some examples, the mobile device 104 may present am "out of range" warning to the user 106 when user 106 approaches a location at which the external antennas 112 are unable to further increase the connection strength. The warning may assist the user 106 in staying within a communication range of the external antennas 112 and/or inform the user 106 that communication with the external antennas 112 will be lost disconnected.

Upon determining that the connection strength is not less than the first strength or upon adjusting the external antennas 112, the antenna adjuster 122 determines whether the connection strength is greater than a predetermined second threshold (block 322). For example, the connection strength may be less than the first threshold if the user 106 with the mobile device 104 is approaching the vehicle 100. In response to determining that the connection strength is not greater than the second threshold, the method 300 returns to block 302. Otherwise, in response to determining that the connection strength is greater than the second threshold, the antenna adjuster 122 adjusts the external antennas 112 to decrease the connection strength between the mobile device 104 and the communication module 102 (block 324). For example, the antenna adjuster 122 decreases the connection strength to communicatively couple to the mobile device 104 in a more energy-efficient manner and/or deter other mobile devices from communicatively coupling with other mobile devices.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a communication circuit for a wireless local area network including an internal antenna and an external antenna; and
   an antenna adjuster to:
      communicatively couple, in response to determining a mobile device is inside a vehicle cabin, the internal antenna to the mobile device;
      communicatively couple, in response to determining the mobile device is outside of the vehicle cabin, the external antenna to the mobile device; and
      compare a connection strength between the external antenna and the mobile device to a first threshold; and
      responsive to the connection strength being less than the first threshold, adjust the external antenna to increase the connection strength.

2. The vehicle of claim 1, wherein the communication circuit includes the antenna adjuster.

3. The vehicle of claim 1, wherein the communication circuit detects the mobile device by broadcasting a beacon to prompt the mobile device to send a return signal and receiving the return signal from the mobile device.

4. The vehicle of claim 1, further including a GPS receiver to determine a vehicle location.

5. The vehicle of claim 4, wherein the antenna adjuster:
collects the vehicle location via the GPS receiver;
collects a location of the mobile device from the mobile device via the communication circuit; and
compares the vehicle location to the location of the mobile device to determine whether the mobile device is inside the vehicle cabin.

6. The vehicle of claim 1, wherein, when the external antenna is communicatively coupled to the mobile device, the communication circuit collects connection strength data from the mobile device.

7. The vehicle of claim 6, wherein the connection strength data includes at least one of a received signal power and a packet error rate.

8. The vehicle of claim 6, wherein the antenna adjuster determines the connection strength based on the connection strength data.

9. The vehicle of claim 6, wherein the antenna adjuster increases the connection strength by increasing a transmitted signal power and adjusting a direction of the external antenna.

10. The vehicle of claim 6, wherein the antenna adjuster compares the connection strength to a second threshold greater than the first threshold and adjusts, in response to determining the connection strength is greater than the second threshold, the external antenna to decrease the connection strength between the external antenna and the mobile device.

11. The vehicle of claim 1, wherein the communication circuit includes a plurality of external antennas to communicatively couple to the mobile device.

12. The vehicle of claim 11, wherein the antenna adjuster utilizes antenna beamforming to form a directional signal from the plurality of external antennas that is directed toward the mobile device to increase a connection strength between the communication circuit and the mobile device.

13. A method for communicatively coupling mobile devices to wireless local area networks of vehicles, the method comprising:
communicatively coupling, via a processor, an internal antenna of a communication circuit of a vehicle to a mobile device in response to determining the mobile device is inside a vehicle cabin;
communicatively coupling an external antenna of the communication circuit to the mobile device in response to determining the mobile device is outside the vehicle cabin;
comparing a connection strength between the external antenna and the mobile device to a first threshold; and
responsive to the connection strength being less than the first threshold, adjusting the external antenna to increase the connection strength.

14. The method of claim 13, further including detecting the mobile device by broadcasting, via the communication circuit, a beacon to prompt the mobile device to send a return signal and receiving, via the communication circuit, the return signal from the mobile device.

15. The method of claim 13, further including:
collecting a vehicle location via a GPS receiver of the vehicle;
collecting, via the communication circuit, a location of the mobile device from the mobile device; and
comparing the vehicle location to the location of the mobile device to determine whether the mobile device is inside the vehicle cabin.

16. The method of claim 13, further including collecting, when the external antenna is communicatively coupled to the mobile device, connection strength data from the mobile device and determining the connection strength based on the connection strength data.

17. The method of claim 16, wherein adjusting the external antenna to increase the connection strength includes increasing a transmitted signal power and adjusting a direction of the external antenna.

18. The method of claim 13, further including utilizing antenna beamforming to form a directional signal from a plurality of external antennas of the vehicle, the directional signal to be directed toward the mobile device to increase a connection strength between the communication circuit and the mobile device.

19. A vehicle comprising:
an internal antenna;
an external antenna; and
processors to:
communicatively couple the internal antennal or the external antenna to a mobile device based on a positon of the mobile device;
compare a connection strength between the external antenna and the mobile device to a threshold; and
responsive to the connection strength being less than the threshold, adjust the external antenna to increase the connection strength.

* * * * *